United States Patent
Chen et al.

(10) Patent No.: US 8,000,458 B2
(45) Date of Patent: Aug. 16, 2011

(54) METHOD AND SYSTEM FOR VERIFYING INCOMING TELEPHONE NUMBERS

(75) Inventors: Yen-Fu Chen, Austin, TX (US); Fabian F. Morgan, Austin, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1161 days.

(21) Appl. No.: 11/558,600

(22) Filed: Nov. 10, 2006

(65) Prior Publication Data

US 2008/0112553 A1     May 15, 2008

(51) Int. Cl.
*H04M 1/56* (2006.01)
(52) U.S. Cl. ........... 379/142.06; 379/88.02; 379/142.01; 379/142.05; 379/221.09; 370/230; 370/360; 370/363; 370/278; 370/395.2
(58) Field of Classification Search ............... 379/88.02, 379/142.05, 142.06, 142.01, 221.09; 370/230, 370/360, 363, 278, 395.2
See application file for complete search history.

(56) References Cited

U.S. PATENT DOCUMENTS

| | | |
|---|---|---|
| 4,788,715 A | 11/1988 | Lee |
| 5,012,510 A | 4/1991 | Schaubs et al. |
| 5,732,132 A | 3/1998 | Hamada |
| 5,832,061 A | 11/1998 | Rubin |
| 5,875,240 A | 2/1999 | Silverman |
| 5,903,642 A | 5/1999 | Schwartz et al. |
| 6,049,601 A | 4/2000 | Orui |
| 6,070,241 A | 5/2000 | Edwards et al. |
| 6,222,920 B1 | 4/2001 | Walker et al. |
| 6,330,327 B1 * | 12/2001 | Lee et al. .................. 379/266.1 |
| 6,373,940 B2 | 4/2002 | Shaffer et al. |
| 6,389,028 B1 | 5/2002 | Bondarenko et al. |
| 6,556,662 B1 | 4/2003 | Miller et al. |
| 6,608,890 B1 | 8/2003 | Schulz et al. |
| 6,631,187 B1 | 10/2003 | Juhola et al. |
| 6,825,276 B2 | 11/2004 | Brown et al. |
| 6,856,678 B2 | 2/2005 | Catley et al. |
| 6,904,138 B1 | 6/2005 | Loebig |
| 6,959,081 B2 | 10/2005 | Brown et al. |
| 7,020,256 B2 | 3/2006 | Jain et al. |
| 7,050,567 B1 | 5/2006 | Jensen |
| 7,050,568 B2 | 5/2006 | Brown et al. |
| 7,095,842 B2 | 8/2006 | Brown et al. |
| 7,130,411 B2 | 10/2006 | Brown et al. |
| 7,162,514 B2 | 1/2007 | Hirai |

(Continued)

OTHER PUBLICATIONS

USPTO office action for U.S. Appl. No. 11/550167 (AUS920060739US1) dated Aug. 20, 2010.

(Continued)

*Primary Examiner* — Melur Ramakrishnaiah
*Assistant Examiner* — Yosef K Laekemariam
(74) *Attorney, Agent, or Firm* — Yee & Associates, P.C.; Mark C. Vallone

(57) ABSTRACT

A system for automatically verifying an incoming telephone number. In response to detecting an incoming communication, a determination is made as to whether a telephone number associated with the incoming communication matches one of a plurality of telephone numbers in a storage unit. In response to determining that the telephone number associated with the incoming communication does not match one of the plurality of telephone numbers in the storage unit, telephone number verification rules are applied to determine whether to continue with the incoming communication. In response to a determination not to continue with the incoming communication based on the telephone number verification rules, an alert is provided.

9 Claims, 2 Drawing Sheets

U.S. PATENT DOCUMENTS

| | | |
|---|---|---|
| 7,233,651 B2 * | 6/2007 | Bull et al. ............... 379/142.08 |
| 7,251,318 B1 | 7/2007 | Henderson |
| 7,437,413 B2 | 10/2008 | Okuyama et al. |
| 7,533,418 B1 | 5/2009 | Yoakum et al. |
| 7,606,351 B2 | 10/2009 | Niwa |
| 7,664,242 B2 | 2/2010 | Finkelman et al. |
| 7,877,083 B2 | 1/2011 | Chen et al. |
| 7,881,701 B2 | 2/2011 | Chen et al. |
| 2003/0103518 A1 | 6/2003 | Han |
| 2003/0108185 A1 | 6/2003 | Brown et al. |
| 2003/0108186 A1 | 6/2003 | Brown et al. |
| 2003/0174830 A1 | 9/2003 | Boyer et al. |
| 2004/0137923 A1 | 7/2004 | Lang |
| 2004/0170258 A1 | 9/2004 | Levin et al. |
| 2005/0125344 A1 | 6/2005 | Utsumi |
| 2005/0254636 A1 | 11/2005 | Niwa |
| 2006/0126810 A1 | 6/2006 | Wilson et al. |
| 2006/0239434 A1 | 10/2006 | Acharya |
| 2006/0273920 A1 | 12/2006 | Doan et al. |
| 2007/0253544 A1 | 11/2007 | Bookstaff |
| 2007/0291925 A1 | 12/2007 | Goldman et al. |
| 2008/0089487 A1 | 4/2008 | Chen et al. |
| 2008/0188202 A1 | 8/2008 | Maeng |
| 2008/0260138 A1 | 10/2008 | Chen et al. |
| 2008/0304647 A1 | 12/2008 | Ikemori et al. |
| 2009/0017806 A1 | 1/2009 | Hayakawa et al. |
| 2009/0092233 A1 | 4/2009 | Meli et al. |
| 2010/0042674 A1 | 2/2010 | Pantalone et al. |
| 2010/0120453 A1 | 5/2010 | Tamchina et al. |

OTHER PUBLICATIONS

USPTO notice of allowance for U.S. Appl. No. 11/550167 (AUS920060739US1) dated Feb. 2, 2011.

USPTO office action for U.S. Appl. No. 11/736702 (AUS920070110US1) dated Sep. 29, 2010.

USPTO notice of allowance for U.S. Appl. No. 11/736702 (AUS920070110US1) dated Mar. 8, 2011.

USPTO office action for U.S. Appl. No. 11/538879 dated May 27, 2010.

USPTO notice of allowance for U.S. Appl. No. 11/538879 dated Sep. 21, 2010.

USPTO office action for U.S. Appl. No. 11/553085 dated May 27, 2010.

USPTO notice of allowance for U.S. Appl. No. 11/553085 dated Sep. 16, 2010.

USPTO office action for U.S. Appl. No. 11/550167 dated Aug. 20, 2010.

USPTO notice of allowance for U.S. Appl. No. 11/550167 dated Feb. 2, 2011.

USPTO office action for U.S. Appl. No. 11/736702 dated Sep. 29, 2010.

USPTO notice of allowance for U.S. Appl. No. 11/736702 dated Mar. 8, 2011.

USPTO office action for U.S. Appl. No. 11/538879 dated May 27, 2010.

USPTO notice of allowance for U.S. Appl. No. 11/538879 dated Sep. 21, 2010.

USPTO office action for U.S. Appl. No. 11/553,085 dated May 27, 2010.

USPTO notice of allowance for U.S. Appl. No. 11/553,085 dated Sep. 16, 2010.

* cited by examiner

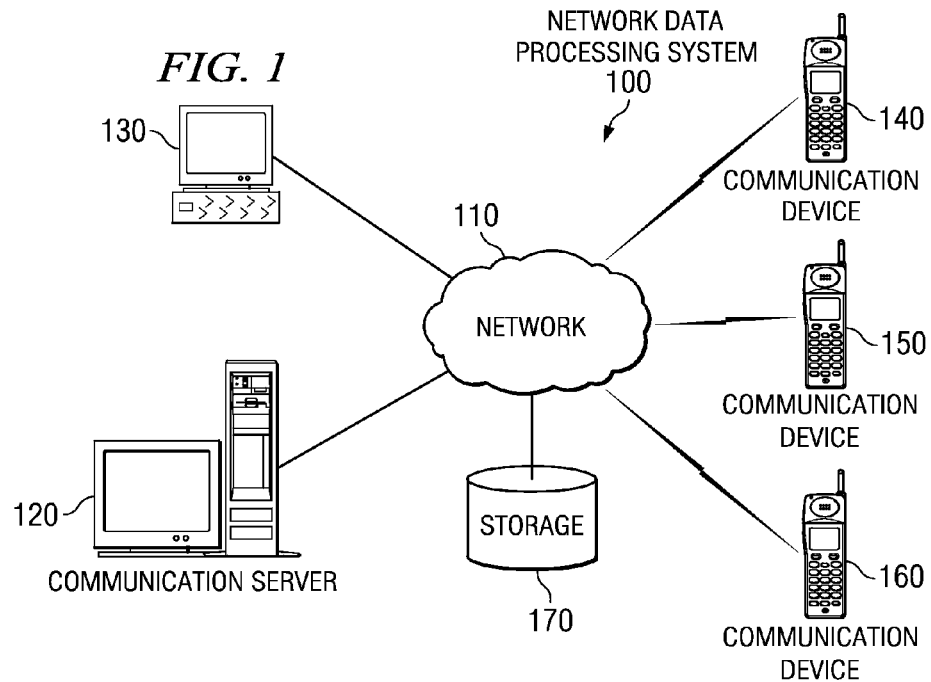
FIG. 1
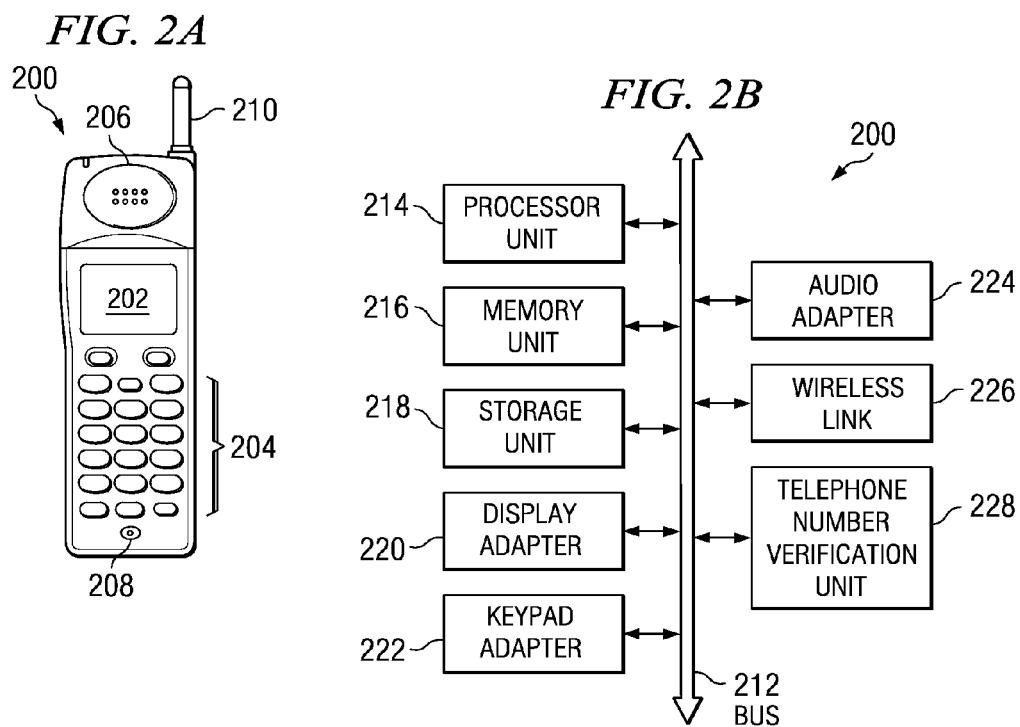
FIG. 2A
FIG. 2B

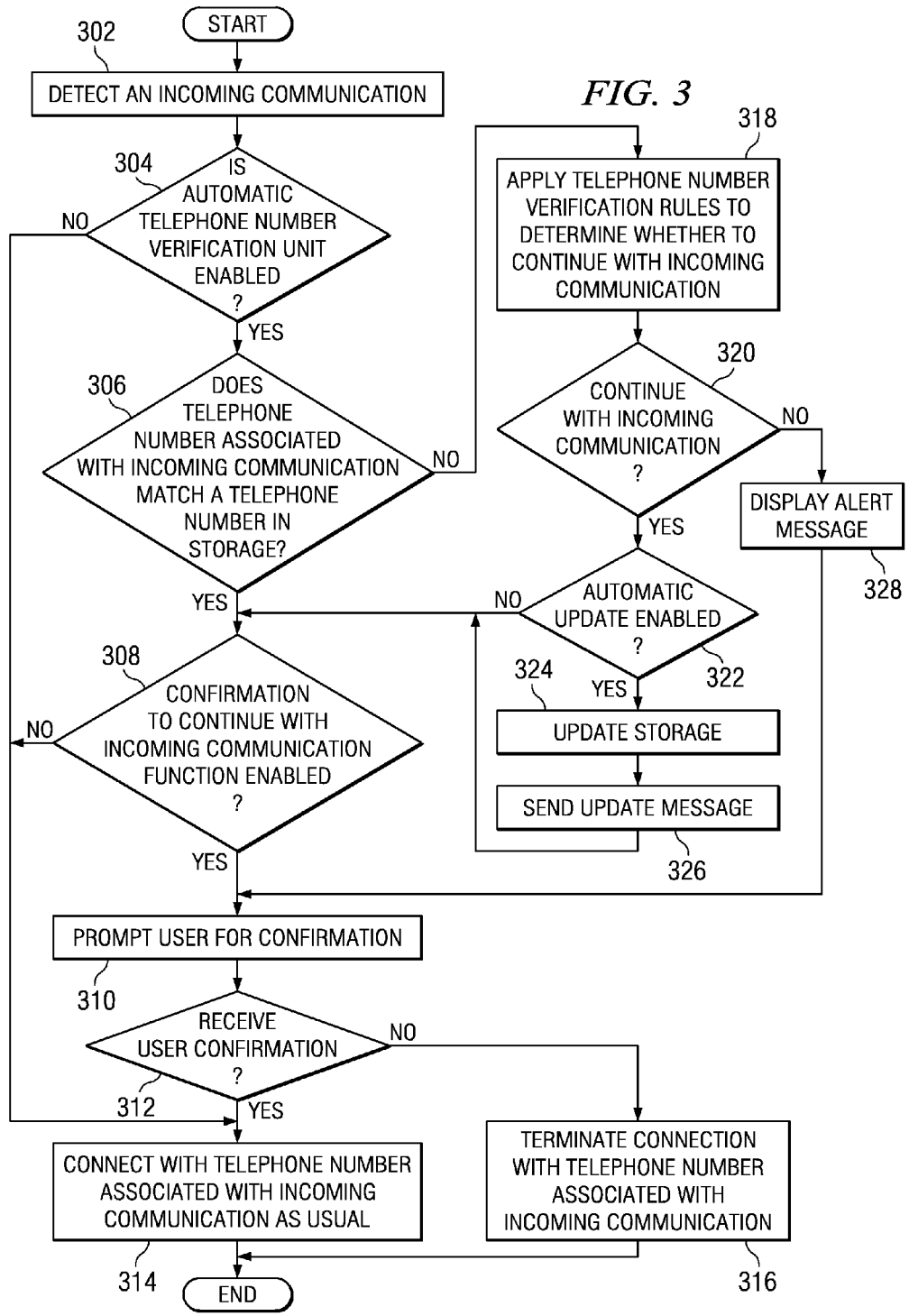

METHOD AND SYSTEM FOR VERIFYING INCOMING TELEPHONE NUMBERS

BACKGROUND OF THE INVENTION

1. Field of the Invention

The present invention relates generally to an improved communication device. More specifically, the present invention is directed to a computer implemented method and computer usable program code for automatically verifying incoming telephone numbers.

2. Description of the Related Art

Innovations in communications technologies have made a wide range of enhanced communications services available to a user. For example, a user may dial a telephone number at the press of a key by using speed-dialing, retrieve a telephone number for a missed call, view a telephone number of an incoming call on a display by using caller identification (caller ID), and send or retrieve a voice message by using voice mail. A communications provider often provides these services through a network such as an intelligent services network (ISN) that is privately owned but that works in conjunction with the public switched telephone network (PSTN). These services also may be offered by a dedicated device, such as a telephone with advanced electronics or a telephone answering machine, located at the user's premises.

However, one problem associated with current communication technologies is that there is no way for a receiving party to automatically verify an unknown incoming telephone number prior to accepting the incoming communication, such as a telephone call or text message. After the receiving party connects with the telephone number associated with the incoming communication, the receiving party may become worried that the incoming communication is unwanted or undesirable. Because there is no way to verify the unknown incoming telephone number, the receiving party must connect with the unknown incoming telephone number to ascertain whether the incoming communication is actually associated with a party the receiving party wants to communicate with. This process of ascertaining whether the incoming communication is desired may be very frustrating to the receiving party. In addition, the receiving party may be responsible for paying a completed call charge to make this determination without any assurance that the incoming communication associated with the unknown telephone number is a communication the receiving party wishes to receive.

Therefore, it would be beneficial to have an improved computer implemented method and computer usable program code for automatically verifying an unknown incoming telephone number prior to accepting the incoming communication.

SUMMARY OF THE INVENTION

Illustrative embodiments provide a computer implemented method and computer usable program code for automatically verifying an incoming telephone number. In response to detecting an incoming communication, a determination is made as to whether a telephone number associated with the incoming communication matches one of a plurality of telephone numbers in a storage unit. In response to determining that the telephone number associated with the incoming communication does not match one of the plurality of telephone numbers in the storage unit, telephone number verification rules are applied to determine whether to continue with the incoming communication. In response to a determination not to continue with the incoming communication based on the telephone number verification rules, an alert is provided.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a network of data processing systems in which illustrative embodiments may be implemented;

FIG. 2A is a pictorial representation of a communication device in which illustrative embodiments may be implemented;

FIG. 2B is a block diagram of a communication device in accordance with an illustrative embodiment; and FIG. 3 is a flowchart illustrating an exemplary process for automatically verifying an incoming telephone number in accordance with an illustrative embodiment.

DETAILED DESCRIPTION OF THE PREFERRED EMBODIMENT

With reference now to the figures, FIG. 1 depicts a pictorial representation of a network of data processing systems in which illustrative embodiments may be implemented. Network data processing system 100 is a network of computers in which illustrative embodiments may be implemented. Network data processing system 100 contains network 110, which is the medium used to provide communication links between various devices and computers coupled together within network data processing system 100. Network 110 may include several types of connections, such as wire, wireless communication links, or fiber optic cables. However, for this illustrative embodiment depicted in FIG. 1, wireless communication links are emphasized.

In the depicted example of FIG. 1, server 120 is coupled to network 110 by wire or wireless communication links. Server 120 may, for example, be a communication server with high speed connections to network 110. Also, server 120 may represent a plurality of communication servers located within a local area network (LAN) or a wide area network (WAN). Further, communication server 120 may, for example, reside within a cellular telephone service provider (SP) network. In another illustrative embodiment, communication server 120 may, for example, independently provide communication services for a plurality of cellular telephone SP networks.

Communication devices 130, 140, 150, and 160, along with storage unit 170, also are coupled to network 110 via wire or wireless links. In addition, communication devices 130, 140, 150, and 160 are clients to communication server 120. In this illustrative example, communication device 130 is a personal computer using a conventional land line communication link and communication devices 140, 150, and 160 are cellular telephones relying on wireless communication links.

However, it should be noted that besides being personal computers and cellular telephones, the communication devices shown in FIG. 1 may, for example, be a personal digital assistants (PDAs), handheld computers, laptop computers, larger data processing systems, other communication servers, or any combination thereof. Furthermore, illustrative embodiments are not restricted to the above-listed communication devices. Illustrative embodiments may utilize any communication device that is capable of accomplishing processes of illustrative embodiments.

Storage unit 170 represents any type of storage device that is capable of storing data in a structured and/or unstructured format. Also, storage unit 170 may represent a plurality of storage units coupled to network 110. Storage unit 170 may, for example, be a database for a cellular telephone SP network that contains customer information, such as customer names and telephone numbers.

Additionally, network data processing system 100 may, for example, include additional servers, clients, storage units, and other devices not shown. Moreover, network data processing system 100 may, for example, represent the Internet with network 110 representing a worldwide collection of networks and gateways that use the transmission control protocol/internet protocol (TCP/IP) suite of protocols to communicate with one another. Internet protocol (IP) telephony is the two-way transmission of voice over a packet-switched IP network, which is part of the TCP/IP suite of protocols. The terms "IP telephony" and "voice over IP" (VoIP) are synonymous. VoIP is a telephone service that uses the Internet as a global telephone network. At the heart of the Internet is a backbone of high-speed data communication lines between major nodes or host computers, consisting of thousands of commercial, government, educational and other computer systems that route data and messages.

It should be appreciated by those of ordinary skill in the art that FIG. 1 is only intended as an exemplary illustration and is not intended as an architectural limitation for illustrative embodiments. Further, it should be appreciated by those of ordinary skill in the art that even though the example of FIG. 1 depicts a telephone network, illustrative embodiments may, for example, be utilized in an electronic mail (e-mail) network, instant messaging network, or any other network system that requires connection data, such as e-mail addresses, instant messaging screen names, and the like, stored in a storage device and used to connect network users with one another. Thus, a user may utilize illustrative embodiments to automatically verify an unknown incoming e-mail address or instant messaging screen name prior to accepting the incoming communication.

Illustrative embodiments provide a computer implemented method and computer usable program code in a communication device for automatically verifying an unknown incoming telephone number for a user (also known as a receiving party) prior to connecting with the incoming telephone number to accept the incoming communication. An unknown incoming telephone number is a telephone number that a receiving party is unfamiliar with and is not contained within a contact list of the receiving party. An incoming communication may, for example, be a telephone call, text message, e-mail, or instant message.

In response to the communication device detecting an incoming communication, the communication device utilizes a telephone number verification unit to determine if the telephone number associated with the incoming communication matches one of a plurality of telephone numbers in a storage unit. The plurality of telephone numbers within the storage unit may be located in one or more contact lists for the receiving party. Also, the storage unit may reside within the communication device or may be a remote storage unit.

In response to determining that the telephone number associated with the incoming communication does not match one of the plurality of telephone numbers in the storage unit, the telephone number verification unit applies telephone number verification rules to determine whether to continue with the incoming communication. In response to a determination not to continue with the incoming communication based on the telephone number verification rules, the telephone number verification unit provides an alert, such as a text message within a display screen of the communication device to inform the receiving party that the incoming communication is questionable. Also, the telephone number verification unit prompts the receiving party for confirmation not to continue with the incoming communication.

In response to a determination to continue with the incoming communication based on the telephone number verification rules, the telephone number verification unit updates the storage unit to include the telephone number associated with the incoming communication, along with the name associated with the telephone number, within a contact list. This automatic updating process may be performed on the fly in the background so the receiving party is not aware of the update. Further, the telephone number verification unit may, for example, display an indicator and/or message to notify the receiving party of the contact list update. Alternatively, the telephone number verification unit may request confirmation prior to saving the calling party's name and telephone number within a contact list. Furthermore, in addition to updating the storage device, the telephone number verification unit sends a message to the telephone number associated with the incoming communication to inform the calling party of the contact list update.

Also, if the telephone number associated with the incoming communication is not currently contained within a contact list, the telephone number verification unit may, for example, display an alert message, such as "Telephone number not currently in contact list". However, it should be noted that illustrative embodiments are not limited to the above-mentioned alert messages. Illustrative embodiments may utilize any type of alert message, such as, for example, "Contact list update message sent" or "Incoming communication questionable". Also, it should be noted that the user may customize alert messages as the user wishes.

A user utilizing a communication device that includes an illustrative embodiment will decrease frustration and money spent trying to ascertain whether to accept an incoming communication from an unknown telephone number that is not within a contact list of the user. Thus, a user's satisfaction is increased by utilizing illustrative embodiments because unknown incoming telephone numbers are automatically verified prior to accepting an incoming communication.

With reference now to FIG. 2A, a pictorial representation of a communication device is depicted in which illustrative embodiments may be implemented. In the illustrative example of FIG. 2A, communication device 200 is a cellular telephone. However, illustrative embodiments may utilize any type of communication device to accomplish processes of illustrative embodiments. Communication device 200 may, for example, be communication device 140 in FIG. 1.

Communication device 200 includes display 202 to present textual and graphical information to a user. Display 202 may be a known display device, such as a liquid crystal display (LCD). Communication device 200 also includes keypad 204, speaker 206, and microphone 208. Keypad 204 may be utilized to enter telephone numbers, user identification information, and commands for interacting with the interface. Audio feedback may be presented via speaker 206. Microphone 208 may be used not only for voice communication, but also for entering specific voice commands for voice actuated functions. Further, communication device 200 uses antenna 210 to establish wireless communication links with a network, such as, for example, network 110 in FIG. 1. However, it should be noted that even though antenna 210 is shown as an external antenna in FIG. 2A, antenna 210 may represent an internal antenna as well.

With reference now to FIG. 2B, a block diagram of a communication device is depicted in accordance with an illustrative embodiment. In the illustrative example of FIG. 2B, communication device 200 utilizes a bus architecture, such as bus 212. Bus 212 may include one or more buses. In addition, bus 212 may be implemented using any type of communication fabric or architecture that provides for a transfer of data between the different components or devices coupled to bus 212.

Communication device 200 includes processor unit 214, memory unit 216, storage unit 218, display adapter 220, keypad adapter 222, audio adapter 224, wireless link 226, and telephone number verification unit 228 connected to bus 212. However, it should be noted that communication device 200 is only shown for exemplary purposes and is not meant as an architectural limitation to illustrative embodiments. Communication device 200 may include more or fewer components as necessary to perform processes of illustrative embodiments.

Processor unit 214 provides the data processing capabilities of communication device 200. An operating system runs on processor unit 214 and coordinates and provides control of various components within communication device 200. In addition, software applications executing on communication device 200 may run in conjunction with the operating system.

Storage unit 218 is a non-volatile memory or storage device that may, for example, be configured as read only memory (ROM) and/or flash ROM to provide the non-volatile memory for storing the operating system and/or user-generated data. Storage unit 218 stores instructions or computer usable program code for the operating system and applications. The instructions are loaded into memory unit 216 for execution by processor unit 214. Processor unit 214 performs processes of illustrative embodiments by executing the computer usable program code that is loaded into memory unit 216.

The user-generated data stored in storage unit 218 may, for example, include data inputted by the user, such as contact names, addresses, descriptions, telephone numbers, e-mail addresses, instant messaging screen names, and the like. However, it should be noted that communication device 200 may store this user-generated data in a remote storage device, such as, for example, storage 170 in FIG. 1, in addition to or instead of storage unit 218. Further, a user may enable communication device 200 to automatically store contact data within storage unit 218 and/or the remote storage device when a calling party connects with communication device 200.

A contact is a person or entity that a user wishes to communicate with via communication device 200. The user may manually, or communication device 200 may automatically, place these contact names, telephone numbers, e-mail addresses, and instant messaging screen names within, for example, a contact list. A contact list is a list of all contacts and associated data.

Alternatively, a contact list may only contain a subset of all the contacts stored within storage unit 218. For example, one contact list may only contain data for family members, another for friends, yet another for co-workers, and so on. As a result, storage unit 218 may contain one or more contact lists for communication device 200. However, it should be noted that storage unit 218 may contain any data necessary for processes of illustrative embodiments to automatically verify an unknown incoming telephone number in real time. Furthermore, communication device 200 may, for example, automatically forward this stored contact list data to a new remote storage device when the user switches to a new SP.

Communication device 200 uses telephone number verification unit 228 to compare this stored contact list data with cellular telephone SP network data provided, for example, by caller ID. Telephone number verification unit 228 compares the incoming telephone number with telephone numbers stored within the user's contact list(s). Illustrative embodiments perform this comparison process to verify that the incoming telephone number is currently within a contact list of the user, which indicates that the user knows the telephone number, prior to accepting the incoming communication.

If the incoming telephone number is not within a contact list of the receiving party, then telephone number verification unit 228 may, for example, apply telephone number verification rules to determine whether to continue with the incoming communication. The telephone number verification rules may, for example, include directives, such as: 1) if the communication device has previously completed a connection with the telephone number associated with the incoming communication three times or more without saving the telephone number to a contact list, then continue with the incoming communication; 2) if the communication device has previously made a connection to the telephone number associated with the incoming communication three times or more without saving the telephone number to a contact list, then continue with the incoming communication; 3) if the communication device has not previously completed a connection with the telephone number associated with the incoming communication or completed a connection with the telephone number two times or less without saving the telephone number to a contact list, then provide an alert; or 4) if the communication device has not previously made a connection to the telephone number associated with the incoming communication or made a connection with the telephone number two times or less, then provide an alert.

The alert may, for example, be a text message that states "Questionable Incoming Communication". In addition, it should be noted that the above-listed exemplary telephone number verification rules are only for illustration purposes and are not meant as limitations to illustrative embodiments. Illustrative embodiments may include any telephone number verification rules necessary to accomplish processes of illustrative embodiments.

Further, it should be noted that a user of communication device 200 may enable and disable telephone number verification unit 228 independently of other communication device 200 functions and features. Furthermore, it should be noted that telephone number verification unit 228 may be implemented entirely as software, hardware, or as a combination of software and hardware components.

Wireless link 226 may, for example, utilize shortwave, high frequency, ultra high frequency, microwave, wireless fidelity (Wi-Fi), Bluetooth, or any other wireless communication means to establish a wireless communication link for communication device 200. Communication device 200 also may rely on wireless application protocol (WAP) for facilitating communications. Wireless application protocol is a standard for providing wireless phones, pagers and other handheld devices with secure access to e-mail and text-based Web pages. Wireless application protocol provides a complete environment for wireless applications that includes a wireless counterpart of TCP/IP and a framework for telephony integration such as call control and phone book access. Wireless application protocol features the wireless markup language (WML), which was derived from Phone.com's handheld device markup language (HDML) and is a streamlined version of hypertext markup language (HTML) for small screen displays. Also, wireless application protocol uses WMLScript, a compact JavaScript-like language that runs in limited memory. Additionally, wireless application protocol supports handheld input methods such as keypad and voice recognition.

Wireless application protocol runs over all the major wireless networks now in place. Also, wireless application protocol is device independent, requiring only a minimum functionality in the unit so that it may be used with a myriad of cellular phones and handheld devices. However, it should be pointed out that wireless application protocol has been described for illustrative purposes, and other wireless protocols may be used to implement illustrative embodiments.

Those of ordinary skill in the art will appreciate that the hardware in FIG. 2A and FIG. 2B may vary depending on implementation of illustrative embodiments. Other internal hardware or peripheral devices may be used in addition to or in place of the hardware depicted in FIG. 2A and FIG. 2B. For example, communication device 200 also may include a voice recognition system in order to perform functions activated by user voice command.

With reference now to FIG. 3, a flowchart illustrating an exemplary process for automatically verifying incoming telephone numbers is shown in accordance with an illustrative embodiment. The process shown in FIG. 3 may be implemented in a communication device, such as, for example, communication device 200 in FIG. 2A and FIG. 2B.

The process begins when the communication device detects an incoming communication (step 302). Subsequent to detecting the incoming communication in step 302, the communication device makes a determination as to whether a user enabled an automatic telephone number verification unit, such as telephone number verification unit 228 in FIG. 2B (step 304). If the user did not enable the automatic telephone number verification unit, no output of step 304, then the process proceeds to step 314 where the communication device connects with the telephone number associated with the incoming communication as usual. If the user did enable the automatic telephone number verification unit, yes output of step 304, then the communication device utilizes the automatic telephone number verification unit to make a determination as to whether the telephone number associated with the incoming communication matches one of a plurality of telephone numbers stored in a storage unit, such as, for example, storage 170 in FIG. 1 and/or storage unit 218 in FIG. 2 (step 306).

If the telephone number associated with the incoming communication does match one of the plurality of telephone numbers stored in the storage unit, yes output of step 306, then the communication device makes a determination as to whether the user enabled a confirmation to continue with the incoming communication function (step 308). If the user did not enable the confirmation to continue with the incoming communication function, no output of step 308, then the process proceeds to step 314 where the communication device connects with the telephone number associated with the incoming communication as usual. If the user did enable the confirmation to continue with the incoming communication function, yes output of step 308, then the communication device uses a display screen, such as display 202 in FIG. 2A, to prompt the user for confirmation to continue with the incoming communication (step 310).

After prompting the user for confirmation to continue with the incoming communication in step 310, the communication device makes a determination as to whether the communication device receives user confirmation (step 312). If the communication device receives user confirmation to continue with the incoming communication, yes output of step 312, then the communication device connects with the telephone number associated with the incoming communication as usual (step 314). If the communication device does not receive user confirmation to continue with the incoming communication, no output of step 312, then the communication device terminates the connection with the telephone number associated with the incoming communication (step 316). The process terminates thereafter.

Returning now to step 306, if the telephone number associated with the incoming communication does not match a telephone number in the storage unit, no output of step 306, then the automatic telephone number verification unit applies telephone number verification rules to determine whether to continue with the incoming communication (step 318).

Subsequent to applying the telephone number verification rules in step 318, the automatic telephone number verification unit makes a determination as to whether to continue with the incoming communication based on applying the telephone number verification rules (step 320). If the automatic telephone number verification unit determines to continue with the incoming communication, yes output of step 320, then the automatic telephone verification unit makes a determination as to whether the user enabled an automatic update function (step 322). If the user did not enable the automatic update function, no output of step 322, then the process returns to step 308 where the communication device makes a determination as to whether the user enabled the confirmation to continue with the incoming communication function. If the user did enable the automatic update function, yes output of step 322, then the automatic telephone number verification unit updates the storage unit to include the telephone number associated with the incoming communication, along with the name associated with the telephone number, in a contact list for the receiving party (step 324).

After updating the contact list in the storage unit is step 324, the automatic telephone number verification unit sends a contact list update message to the telephone number associated with the incoming communication to alert the calling party of the receiving party's contact list update (step 326). Subsequent to sending the contact list update message to the telephone number associated with the incoming communication in step 326, the process returns to step 308 where the communication device makes a determination as to whether the user enabled the confirmation to continue with the incoming communication function.

Returning now to step 320, if the automatic telephone number verification unit determines not to continue with the incoming communication, no output of step 320, then the automatic telephone verification unit displays an alert, such as a "Questionable Incoming Communication" text message, in the display screen for the user to view (step 328). In another illustrative embodiment, the automatic telephone verification unit may provide, for example, an indicator, such as a selectable background color or symbol within the display screen or a selectable audible tone, to indicate that the incoming communication is questionable. In yet another illustrative embodiment, the automatic telephone verification unit may provide both the alert message and the indicator to alert the user that the incoming communication is questionable. After displaying the alert message in step 328, the process returns to step 310 where the automatic telephone verification unit prompts the user for confirmation to continue with the incoming communication.

Thus, illustrative embodiments provide a computer implemented method, system, and computer usable program code for automatically verifying an unknown incoming telephone number. The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a ROM, a rigid magnetic disk, and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a mobile communication device for automatically verifying an incoming telephone number, the method comprising:
   responsive to detecting an incoming communication by the mobile communication device, determining, by the mobile communication device, whether a user enabled a telephone number verification unit within the mobile communication device;
   responsive to a determination that the user did not enable the telephone number verification unit within the mobile communication device, connecting, by the mobile communication device, with a telephone number associated with the incoming communication;
   responsive to a determination that the user did enable the telephone number verification unit within the mobile communication device, determining, by the mobile communication device utilizing the telephone number verification unit, whether the telephone number associated with the incoming communication matches one of a plurality of telephone numbers in a storage unit within the mobile communication device;
   responsive to a determination that the telephone number associated with the incoming communication does match one of the plurality of telephone numbers stored in the storage unit within the mobile communication device, determining, by the mobile communication device, whether the user enabled a confirmation to continue with the incoming communication function within the mobile communication device;
   responsive to a determination that the user did not enable the confirmation to continue with the incoming communication function within the mobile communication device, connecting, by the mobile communication device, with the telephone number associated with the incoming communication;
   responsive to a determination that the user did enable the confirmation to continue with the incoming communication function within the mobile communication device, using, by the mobile communication device, a display screen to prompt the user for confirmation to continue with the incoming communication;
   responsive to the mobile communication device prompting the user for the confirmation to continue with the incoming communication, determining, by the mobile communication device, whether the mobile communication device received the confirmation from the user to continue with the incoming communication;
   responsive to the mobile communication device receiving the confirmation from the user to continue with the incoming communication, connecting, by the mobile communication device, with the telephone number associated with the incoming communication;
   responsive to the mobile communication device not receiving the confirmation from the user to continue with the incoming communication, terminating, by the mobile communication device, the connection with the telephone number associated with the incoming communication;
   responsive to a determination that the telephone number associated with the incoming communication does not match one of the plurality of telephone numbers in the storage unit within the mobile communication device, applying, by the mobile communication device, telephone number verification rules to determine whether to continue with the incoming communication, wherein the telephone number verification rules direct the mobile communication device to continue with the incoming communication in response to the mobile communication device having previously completed a connection with the telephone number associated with the incoming communication a first predetermined number of times or more without saving the telephone number to a contact list in the storage unit within the mobile communication device, to continue with the incoming communication in response to the mobile communication device having previously made a connection to the telephone number associated with the incoming communication the first predetermined number of times or more without saving the telephone number to the contact list in the storage unit within the mobile communication device, to display a selectable background color alert within a display screen in response to the mobile communication device not having previously completed a connection with the telephone number associated with the incoming communication a second predetermined number of times or less without saving the telephone number to the contact list in the storage unit within the mobile communication device, or to display the selectable background color alert within the display screen in response to the mobile communication device not having previously made a connection to the telephone number associated with the incoming communication the second predetermined number of times or less;

determining, by the mobile communication device, whether to continue with the incoming communication based on the telephone number verification rules;

responsive to a determination not to continue with the incoming communication based on the telephone number verification rules, displaying, by the mobile communication device, the selectable background color alert within the display screen of the mobile communication device to indicate that the incoming communication is questionable;

responsive to a determination to continue with the incoming communication based on the telephone number verification rules, determining, by the mobile communication device, whether the user enabled an automatic update function within the mobile communication device;

responsive to a determination that the user did enable the automatic update function within the mobile communication device, updating, by the mobile communication device, the storage unit within the mobile communication device to include the telephone number associated with the incoming communication and a name associated with the telephone number; and sending, by the mobile communication device, an update message to the telephone number associated with the incoming communication to alert a calling party of an update to the storage unit within the mobile communication device to include the telephone number.

2. The computer implemented method of claim 1, wherein the storage unit stores data, and wherein the data includes contact names, telephone numbers, electronic mail addresses, and instant messaging screen names, and wherein the data is located within one or more contact lists.

3. The computer implemented method of claim 1, wherein the incoming communication is one of a telephone call, text message, electronic mail, or instant message.

4. A computer program product stored on a computer readable storage medium encoded with instructions capable of being executed by a computer for automatically verifying an incoming telephone number, the computer program product comprising:

instructions, responsive to detecting an incoming communication, for determining whether a user enabled a telephone number verification unit;

instructions, responsive to a determination that the user did not enable the telephone number verification unit, for connecting with a telephone number associated with the incoming communication;

instructions, responsive to a determination that the user did enable the telephone number verification unit, for determining whether the telephone number associated with the incoming communication matches one of a plurality of telephone numbers in a storage unit;

instructions, responsive to a determination that the telephone number associated with the incoming communication does match one of the plurality of telephone numbers stored in the storage unit, for determining whether the user enabled a confirmation to continue with the incoming communication function;

instructions, responsive to a determination that the user did not enable the confirmation to continue with the incoming communication function, for connecting with the telephone number associated with the incoming communication;

instructions, responsive to a determination that the user did enable the confirmation to continue with the incoming communication function, for using a display screen to prompt the user for confirmation to continue with the incoming communication;

instructions, responsive to prompting the user for the confirmation to continue with the incoming communication, for determining whether the mobile communication device received the confirmation from the user to continue with the incoming communication;

instructions, responsive receiving the confirmation from the user to continue with the incoming communication, for connecting with the telephone number associated with the incoming communication;

instructions, responsive to not receiving the confirmation from the user to continue with the incoming communication, for terminating the connection with the telephone number associated with the incoming communication;

instructions, responsive to a determination that the telephone number associated with the incoming communication does not match one of the plurality of telephone numbers in the storage unit, for applying telephone number verification rules to determine whether to continue with the incoming communication, wherein the telephone number verification rules direct the mobile communication device to continue with the incoming communication in response to the mobile communication device having previously completed a connection with the telephone number associated with the incoming communication a first predetermined number of times or more without saving the telephone number to a contact list in the storage unit within the mobile communication device, to continue with the incoming communication in response to the mobile communication device having previously made a connection to the telephone number associated with the incoming communication the first predetermined number of times or more without saving the telephone number to the contact list in the storage unit within the mobile communication device, to display a selectable background color alert within a display screen in response to the mobile communication device not having previously completed a connection with the telephone number associated with the incoming communication a second predetermined number of times or less without saving the telephone number to the contact list in the storage unit within the mobile communication device, or to display the selectable background color alert within the display screen in response to the mobile communication device not having previously made a connection to the telephone number associated with the incoming communication the second predetermined number of times or less;

instructions for determining whether to continue with the incoming communication based on the telephone number verification rules;

instructions, responsive to a determination not to continue with the incoming communication based on the telephone number verification rules, for displaying the selectable background color alert within the display screen to indicate that the incoming communication is questionable;

instructions, responsive to a determination to continue with the incoming communication based on the telephone number verification rules, for determining whether the user enabled an automatic update function;

instructions, responsive to a determination that the user did enable the automatic update function, for updating the storage unit to include the telephone number associated with the incoming communication and a name associated with the telephone number; and instructions for sending an update message to the telephone number associated with the incoming communication to alert a calling party of an update to the storage unit to include the telephone number.

5. The computer program product of claim 4, wherein the storage unit stores data, and wherein the data includes contact names, telephone numbers, electronic mail addresses, and instant messaging screen names, and wherein the data is located within one or more contact lists.

6. The computer program product of claim 4, wherein the incoming communication is one of a telephone call, text message, electronic mail, or instant message.

7. A mobile communication device for automatically verifying an incoming telephone number, the mobile communication device comprising:

a bus system;

a storage device connected to the bus system, wherein the storage device stores instructions; and a processor unit connected to the bus system, wherein the processor unit executes the instructions to determine whether a user enabled a telephone number verification unit within the mobile communication device in response to detecting an incoming communication by the mobile communication device; connect with a telephone number associated with the incoming communication in responsive to a determination that the user did not enable the telephone number verification unit within the mobile communication device; determine whether the telephone number associated with the incoming communication matches one of a plurality of telephone numbers in the storage device in response to a determination that the user did enable the telephone number verification unit within the mobile communication device; determine whether the user enabled a confirmation to continue with the incoming communication function within the mobile communication device in response to a determination that the telephone number associated with the incoming communication does match one of the plurality of telephone numbers stored in the storage device; connect with the telephone number associated with the incoming communication in response to a determination that the user did not enable the confirmation to continue with the incoming communication function within the mobile communication device; use a display screen to prompt the user for confirmation to continue with the incoming communication in response to a determination that the user did enable the confirmation to continue with the incoming communication function within the mobile communication device; determine whether the mobile communication device received the confirmation from the user to continue with the incoming communication in response to the mobile communication device prompting the user for the confirmation to continue with the incoming communication; connect with the telephone number associated with the incoming communication in response to the mobile communication device receiving the confirmation from the user to continue with the incoming communication; terminate the connection with the telephone number associated with the incoming communication in response to the mobile communication device not receiving the confirmation from the user to continue with the incoming communication; apply telephone number verification rules to determine whether to continue with the incoming communication in response to a determination that the telephone number associated with the incoming communication does not match one of the plurality of telephone numbers in the storage device, wherein the telephone number verification rules direct the mobile communication device to continue with the incoming communication in response to the mobile communication device having previously completed a connection with the telephone number associated with the incoming communication a first predetermined number of times or more without saving the telephone number to a contact list in the storage unit within the mobile communication device, to continue with the incoming communication in response to the mobile communication device having previously made a connection to the telephone number associated with the incoming communication the first predetermined number of times or more without saving the telephone number to the contact list in the storage unit within the mobile communication device, to display a selectable background color alert within a display screen in response to the mobile communication device not having previously completed a connection with the telephone number associated with the incoming communication a second predetermined number of times or less without saving the telephone number to the contact list in the storage unit within the mobile communication device, or to display the selectable background color alert within the display screen in response to the mobile communication device not having previously made a connection to the telephone number associated with the incoming communication the second predetermined number of times or less; determine whether to continue with the incoming communication based on the telephone number verification rules; display the selectable background color alert within the display screen of the mobile communication device to indicate that the incoming communication is questionable in response to a determination not to continue with the incoming communication based on the telephone number verification rules; determine whether the user enabled an automatic update function within the mobile communication device in response to a determination to continue with the incoming communication based on the telephone number verification rules; update the storage device to include the telephone number associated with the incoming communication and a name associated with the telephone number in response to a determination that the user did enable the automatic update function within the mobile communication device; and send an update message to the telephone number associated with the incoming communication to alert a calling party of an update to the storage device to include the telephone number.

8. The mobile communication device of claim 7, wherein the storage unit stores data, and wherein the data includes contact names, telephone numbers, electronic mail addresses, and instant messaging screen names, and wherein the data is located within one or more contact lists.

9. The mobile communication device of claim 7, wherein the incoming communication is one of a telephone call, text message, electronic mail, or instant message.

* * * * *